United States Patent
Barger et al.

(10) Patent No.: US 8,005,631 B2
(45) Date of Patent: Aug. 23, 2011

(54) SYSTEM AND METHOD FOR IDENTIFYING A MUZZLE BLAST USING A MULTI-SENSOR TOTAL ENERGY APPROACH

(75) Inventors: James E. Barger, Winchester, MA (US); Stephen D. Milligan, Stow, MA (US); Marshall Seth Brinn, Newton, MA (US); Richard J. Mullen, Needham, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 341 days.

(21) Appl. No.: 12/074,884

(22) Filed: Mar. 7, 2008

(65) Prior Publication Data

US 2008/0162089 A1   Jul. 3, 2008

Related U.S. Application Data

(62) Division of application No. 11/210,295, filed on Aug. 23, 2005, now Pat. No. 7,359,285.

(51) Int. Cl.
*G06F 19/00* (2006.01)
(52) U.S. Cl. ............... 702/60; 702/66; 702/79; 702/189
(58) Field of Classification Search .......... 73/579; 324/642; 367/118, 124, 127, 906; 702/60, 702/66, 79, 189
See application file for complete search history.

(56) References Cited

U.S. PATENT DOCUMENTS

| | | | |
|---|---|---|---|
| 2,435,231 A | 2/1948 | McPherson | |
| 2,963,696 A | 11/1960 | Snyder | |
| 4,283,989 A * | 8/1981 | Toulios et al. | 89/6.5 |
| 4,813,877 A | 3/1989 | Sanctuary et al. | |
| 4,970,698 A | 11/1990 | Dumestre, III | |
| 5,241,518 A | 8/1993 | McNelis et al. | |
| 5,280,457 A | 1/1994 | Figueroa et al. | |
| 5,346,210 A | 9/1994 | Utke et al. | |
| 5,392,258 A | 2/1995 | Gabrielson et al. | |
| 5,544,129 A | 8/1996 | McNelis | |
| 5,617,371 A | 4/1997 | Williams | |
| 5,703,321 A | 12/1997 | Feierlein et al. | |
| 5,777,948 A | 7/1998 | Ferkinhoff et al. | |

(Continued)

FOREIGN PATENT DOCUMENTS

EP    0447725    9/1991

(Continued)

OTHER PUBLICATIONS

Mays, 'Sockwave and Muzzle Blast Classification via Joint Time Frequency and Wavelet Analysis', Sep. 30, 2001, US Army Publication, pp. 1-14.*

(Continued)

*Primary Examiner* — Mohamed Charioui
*Assistant Examiner* — Elias Desta
(74) *Attorney, Agent, or Firm* — Ropes & Gray LLP

(57) ABSTRACT

Systems and methods for locating the shooter of supersonic projectiles are described. The system uses at least five, preferably seven, spaced acoustic sensors. Sensor signals are detected for shockwaves and muzzle blast, wherein muzzle blast detection can be either incomplete coming from less than 4 sensor channels, or inconclusive due to lack of signal strength. Shooter range can be determined by an iterative computation and/or a genetic algorithm by minimizing a cost function that includes timing information from both shockwave and muzzle signal channels. Disambiguation is significantly improved over shockwave-only measurements.

12 Claims, 4 Drawing Sheets

U.S. PATENT DOCUMENTS

| | | | |
|---|---|---|---|
| 5,781,505 | A | 7/1998 | Rowland |
| 5,878,000 | A | 3/1999 | Dubois |
| 5,912,862 | A | 6/1999 | Gustavsen et al. |
| 5,920,522 | A | 7/1999 | Levanon |
| 5,930,202 | A | 7/1999 | Duckworth et al. |
| 5,970,024 | A | 10/1999 | Smith |
| 5,973,998 | A | 10/1999 | Showen et al. |
| 6,055,523 | A | 4/2000 | Hillis |
| 6,178,141 | B1 | 1/2001 | Duckworth et al. |
| 6,198,694 | B1 | 3/2001 | Kroling et al. |
| 6,223,458 | B1 * | 5/2001 | Schwinkendorf et al. ..... 42/1.06 |
| 6,370,084 | B1 | 4/2002 | Cray |
| 6,487,516 | B1 | 11/2002 | Amorai-Moriya |
| 6,563,763 | B2 | 5/2003 | McNelism |
| 6,621,764 | B1 | 9/2003 | Smith |
| 6,847,587 | B2 | 1/2005 | Patterson et al. |
| 6,965,312 | B2 | 11/2005 | Lerg |
| 6,965,541 | B2 | 11/2005 | Lapin et al. |
| 7,054,228 | B1 | 5/2006 | Hickling |
| 7,126,877 | B2 | 10/2006 | Barger et al. |
| 7,139,222 | B1 | 11/2006 | Baxter et al. |
| 7,162,043 | B2 | 1/2007 | Sugiyama et al. |
| 7,190,633 | B2 | 3/2007 | Brinn et al. |
| 7,203,132 | B2 | 4/2007 | Berger |
| 7,266,045 | B2 | 9/2007 | Baxter et al. |
| 7,292,501 | B2 | 11/2007 | Barger |
| 7,362,654 | B2 | 4/2008 | Bitton |
| 7,372,773 | B2 | 5/2008 | Horak |
| 7,372,774 | B1 | 5/2008 | Uzes |
| 7,411,865 | B2 | 8/2008 | Calhoun |
| 7,420,878 | B2 | 9/2008 | Holmes et al. |
| 7,433,266 | B2 | 10/2008 | Ledeczi et al. |
| 7,474,589 | B2 | 1/2009 | Showen et al. |
| 7,495,998 | B1 | 2/2009 | Deligeorges et al. |
| 7,502,279 | B2 | 3/2009 | Wignall et al. |
| 7,532,542 | B2 | 5/2009 | Baxter et al. |
| 2002/0003470 | A1 | 1/2002 | Auerbach |
| 2002/0029214 | A1 | 3/2002 | Yianilos et al. |
| 2004/0100868 | A1 | 5/2004 | Patterson, Jr. et al. |
| 2005/0237186 | A1 | 10/2005 | Fisher et al. |
| 2006/0044941 | A1 | 3/2006 | Barger |
| 2006/0256660 | A1 | 11/2006 | Berger |
| 2007/0030763 | A1 | 2/2007 | Barger et al. |
| 2007/0171769 | A1 | 7/2007 | Brinn et al. |
| 2007/0230269 | A1 | 10/2007 | Ledeczi et al. |
| 2008/0008044 | A1 | 1/2008 | Patterson et al. |
| 2008/0084473 | A1 | 4/2008 | Romanowich |
| 2008/0298176 | A1 | 12/2008 | Fisher et al. |
| 2009/0086577 | A1 | 4/2009 | Ledeczi et al. |

FOREIGN PATENT DOCUMENTS

| | | |
|---|---|---|
| GB | 2015127 | 9/1979 |
| GB | 2181239 | 4/1987 |
| GB | 2181240 | 4/1987 |
| WO | WO-0137483 | 5/2001 |
| WO | WO-02082097 | 10/2002 |
| WO | WO-2009046367 | 4/2009 |
| WO | WO-2009053702 | 4/2009 |

OTHER PUBLICATIONS

Molnar et al., 'Muzzle Blast Detection Via Short Time Fourier Transform', Feb. 2005, Vanderbelt University, pp. 1-2.*

Stoughton, R.B., "SAIC Sentinel Acoustic Counter-Sniper System," Proceedings of SPIE, vol. 2938, Nov. 19, 1996, pp. 276-284, XP00251780, Section 3.

European Search Report in European Application No. EP08004009 dated Mar. 11, 2009.

U.S. Appl. No. 11/904,452, unpublished, Brinn et al.

Pierce, Allen D., "Nonlinear Effects in Sound Propagation", Acoustics, McGraw-Hill Book Company, pp. 611-614 (1981).

Kalyanmoy DEB, Mult-Objective Optimization Using Evolutionary Algorithms, John Wiley & Sons, Ltd., pp. 85-101 (2001).

Pecina, J.N., "Unmanned Navigation with a Novel Laser and a Smart Software," Aerospace Conference, 2003. Proceedings. 2003 IEEE, vol. 1, Mar 8-15, 2003 pp. 305-312.

Ledeczi et al, "Multiple Simultaneous Acoustic Source Localization in Urban Terrain." Institute for Software Integrated Systems, pp. 491-496, ISBN#0-7803-9201-9.

Maroti et al, "Shooter Localization in Urban Terrain," Computer, 37:8, Aug. 2004, pp. 60-61.

Danicki, "The shock wave-based acoustic sniper localization," Nonlinear Analysis, 65 (2006), pp. 956-962.

Final Office Action, U.S. Appl. No. 12/075,051, mailed Feb. 10, 2009.

Karsai et al, "A Model-based Front-end to TAO/ACE: The Embedded System Modeling Language" Institute for Software-Integrated Systems, Vanderbilt University (2008).

Collings, S.W., "Acoustic Beamforming on Wireless Sensor Nodes", Thesis submitted to the Faculty of the Graduate School of Vanderbilt University, May 2008.

Livingston, et al, "An augmented reality system for military operations in urban terrain", Proceedings of the Interservice/Industry Training, Simulation & Education Conference (I/ITSEC '02), Dec. 2-5, 2002.

Julier, et al, "BARS: Battlefield Augmented Reality System", Advanced Information Technology, Naval Research Laboratory (2007 ??????).

"Countersniper System", ISIS, 2008; Vanderbilt University/School of Engineering, retrieved from http://www.isis.vanderbilt.edu/projects/countersniper on Aug. 6, 2009.

Chadha, Ankit, "Development of a new technology for sound source localisation", Thesis submitted to the Faculty of the Graduate School of Wayne State University, Detroit, Michigan (2007).

Kusy, et al, "Elapsed time on arrival: a simple and versatile primitive for canonical time synchronisation services", Int. J. Ad Hoc and Ubiquitous Computer, vol. x, No. x, 200x (2006).

Boggs, Jeffrey A., "Geolocation of an Audio Source in a Multipath Environment Using Time-of-Arrival" Air Force Institute of Technology, Graduate School of Engineering and Management Mar. 2003-Mar. 2004.

Ledeczi, et al, "Multiple Simultaneous Acoustic Source Localization in Urban Terrain", Institute for Software Integrated Systems, Vanderbilt University (2005).

Salisbury, David F, "Network turns soldiers' helmets into sniper location system", Phys.Org.com, retrieved from http://www.physorg.com/news157123967.html on Aug. 7, 2009.

Chu, et al, "Semantic context detection using audio event fusion: Camera-ready version", EURASIP Journal on Applied Signal Processing, vol. 2006, Article ID 27390, pp. 1-12.

Martinez, et al, "Sensor network applications", IEE Computer Society, vol. 37, No. 8, Aug. 2004.

Kushwaha, et al, "Sensor Node Localization Using Mobile Acoustic Beacons". Institute for Software Integrated Systems, Vanderbilt University (2005).

Volgyesi, et all, "Shooter localization and weapon classification with soldier-wearable networked sensors", Institute for Software Integrated Systems, Vanderbilt University (2008).

Stephen, Tan Kok Sin, "Source Localization Using Wireless Sensor Networks", Naval Postgraduate School, Jun. 2006.

Marano, et al, "Support-based and ML approaches to DOA estimation in a dumb sensor network", IEE Transactions on Signal Processing, vol. 54, No. 4, Apr. 2006.

Chu, et al, "Toward semantic indexing and retrieval using hierarchical audio models", Multimedia Systems (2005) 10(6): 570-583; Received: Apr. 16, 2004 / Revised: Nov. 20, 2004 / Published online: May 10, 2005.

Balogh, et al, "Wireless Sensor Network-Based Projectile Trajectory Estimation", Institute for Software Integrated Systems, Vanderbilt University (2008).

Maroti, et al, "Shooter Localization in Urban Terrain", Vanderbilt University, Aug. 2004.

Danicki, E., "The shock wave-based acoustic sniper localization", Elsevier, 2005.

* cited by examiner

US 8,005,631 B2

SYSTEM AND METHOD FOR IDENTIFYING A MUZZLE BLAST USING A MULTI-SENSOR TOTAL ENERGY APPROACH

CROSS-REFERENCE TO RELATED APPLICATIONS

This application is a divisional application of U.S. patent application Ser. No. 11/210,295, filed Aug. 23, 2005, the entire contents of which are incorporated herein by reference.

GOVERNMENT CONTRACT

The U.S. Government has a paid-up license in this invention and the right in limited circumstances to require the patent owner to license others on reasonable terms as provided for by the terms of Contract No. HR0011-04-C-0035 awarded by DARPA ATO.

BACKGROUND OF THE INVENTION

The present invention relates to law enforcement technologies and security, and more particularly to methods and systems for determining the origin and direction of travel of supersonic projectiles based on shockwave and muzzle sound information. The methods and systems are capable of determining and disambiguating shooter locations even for large distances between shooter and sensor and when the signal from the muzzle sound is weak.

Systems and methods are known that can determine the general direction and trajectory of supersonic projectiles, such as bullets and artillery shells by measuring parameters associated with the shockwave generated by a projectile. One such system, described in U.S. Pat. No. 5,241,518 includes at least three spaced-apart sensors, with each sensor incorporating three acoustic transducers arranged in a plane. The sensors generate signals in response to the shockwave which are related to the azimuth and elevation angle to the origin of the shockwave. However, shock-wave-only measurements are unable to determine the distance between the sensor(s) and the origin of the shockwave. With additional information from the muzzle blast, an accurate location of the origin of the projectile and a line of bearing to the origin of the projectile can be determined. However, when the muzzle blast is masked, shadowed or otherwise distorted, the signal from the muzzle blast may be difficult to discern from spurious signals and noise, so that the derived distance information may become inaccurate. Moreover, even if a clearly discernable muzzle blast signal were received from distant shooter locations, determining the range (distance) of the shooter can still remain a problem.

Conventional systems employ acoustic sensors, e.g., microphones, which can be relatively closely spaced (e.g., 1 meter apart) or widely dispersed (e.g., mounted on a vehicle or carried by soldiers on a battlefield), and measure shock-wave pressure omni-directionally at their respective locations.

The azimuth angle, elevation angle, and range of a shooter with reference to the sensor location can be determined by measuring Time-of-Arrival (TOA) information of the muzzle signal and shockwave signal at each sensor. Each of the sensors encounters these signals at a different time and generates an electric signal in response to the shockwave pressure. The signals from the various sensors are processed, and a direction (azimuth and elevation) from the sensor(s) to the origin of the shockwave as well as the range, and hence the trajectory of the projectile can be determined.

Conventional algorithms require at least 4 shockwave and muzzle detections so that a 4×4 matrix can be inverted to map a plane wave on the shockwave TOA. Small errors in shock and muzzle TOA determination can produce substantial errors in the range estimations. Moreover, the conventional algorithms assume a constant bullet speed along the bullet trajectory, which gives inaccurate range estimates for long-range shots being fired from a distance of more than approximately 300 m.

Accordingly, there is a need for rapidly converging algorithms capable of accurately estimating a distant shooter range.

In addition, there is a need to disambiguate shock-wave only solutions for the shooter direction. This is typically accomplished by using the muzzle signal. Disadvantageously, however, less than 4 muzzle sounds may be detected in many situations, for example, due to extraneous noise, reflections, etc., that can mask the muzzle signal. It would therefore be desirable to provide a method for reliably disambiguating shock-wave only solutions even if muzzle blast signals are detected on less than 4, for example 2 or 3, acoustic sensors.

In some situations, an initially detected muzzle signal may be discarded as being unreliable, for example, because the detection level is too low to indicate a muzzle blast signal; or because the muzzle energy is not readily evident in the raw signal; or because echoes from the shockwave are stronger than the muzzle blast and arrive earlier than the actual muzzle blast, causing the detection system to falsely identify shock as muzzle. These uncertain muzzle blast signals, if properly identified and extracted, may still be useful for refining detection of the shooter position, in particular in conjunction with the detection of shock-wave signals.

It would therefore also be desirable to provide a method for extracting muzzle signals that may be obscured by acoustic signatures unrelated to the muzzle blast.

SUMMARY OF THE INVENTION

The invention addresses the deficiencies of the prior art by, in various embodiments, providing methods and systems for estimating shooter range for long-range shots, in particular, when muzzle signals are either weak or detected in an insufficient number of detection channels. The disclosed methods and systems also improve disambiguation of shockwave-only shooter trajectory solutions by including detected muzzle sound in the optimization process.

According to one aspect of the invention, in a method for estimating a shooter range by detecting shock wave and muzzle blast, shockwave-only signals as well as muzzle blast signals are measured at a plurality of spaced acoustic sensors forming an antenna. An initial shooter range is estimated from the measured shock wave and muzzle blast signals, assuming an initial bullet velocity and a bullet drag coefficient. The instantaneous bullet velocity along a bullet trajectory is iteratively computed to obtain an updated shooter range. The number of muzzle blast detection channels is usually less than the number of shockwave detection channels.

Advantageous embodiments may include one or more of the following features. A time-difference-of-arrival (TDOA) between the shockwave-only signals and the muzzle blast signals and an arrival angle are computed for determining the initial shooter range. A certain number of iterations may be performed, or the updated shooter range will be considered to be the final shooter range if a relationship between successively determined updated shooter ranges satisfies the convergence criterion. For example, the convergence criterion may be selected so that the difference between the successively determined updated shooter ranges or a percentage change between the successively determined updated shooter ranges is smaller than a predetermined value. To obtain real solutions, the computed bullet velocity is set to always be at least the speed of sound. The solutions are checked for consistency. For example, the updated shooter range is considered invalid if a bullet trajectory angle and an arrival angle are determined to be greater than a predetermined value.

Even if the computed shooter range is determined to be invalid, a solution may still be obtained by applying a genetic algorithm (GA). For example, an initial population of the GA with a predetermined number of individuals can be defined, where each individual is represented by a 3-tupel which includes an assumed shooter range, a missed azimuth (MA) and a missed elevation (ME) of the bullet trajectory. The GA is performed for a predefined number of generations, and residuals for the individuals in each generation are computed. In each generation the solution with the smallest residual is selected as the individual which survives unmutated. The solution having the smallest residual is selected as the updated shooter range. The solution can be refined by performing for each 3-tupel in a generation a predetermined number of iterations to compute a revised shooter range, wherein the residuals for the individuals in each generation are computed with the revised shooter range.

The GA includes crossover and mutation operators. The crossover operator exchanges at least one of missed azimuth and missed elevation between two individuals from the population in a generation, whereas the mutation operator comprises field-mutation (replacing a value of the 3-tupel with a randomly selected value), incremental mutation (inducing a small mutation in all fields of the 3-tupel), and no mutation (leaving the individuals in a generation unaltered).

According to yet another aspect of the invention, a method for disambiguating a projectile trajectory from shockwave signals and from a limited number of muzzle blast signals includes measuring shockwave-only signals at five or more spaced acoustic sensors forming an antenna, measuring muzzle blast signals on at most 4 of the sensors, and determining from the shockwave-only signals Time-Differences-Of-Arrival (TDOA) information for sensor pairs. The method further includes performing for a predefined number of generations a genetic algorithm with an initial population that includes a predetermined number of individuals, each individual represented by a 4-tupel which includes shooter azimuth, shooter elevation, missed azimuth and missed elevation, and computing residuals for the individuals in each generation, with the residuals including a least-square fit of a combination of TDOA shockwave and muzzle blast signals. If a ratio of the solution having the smallest residual and its ambiguous alternate solution is greater than a predefined value, the solution having the smallest computed residual is designated as the disambiguated projectile trajectory.

According to another aspect of the invention, a method for extracting a signal from a muzzle wave in the presence of a shockwave signal includes defining a time window having a width corresponding to a time required for a muzzle wave to traverse a sensor array and detecting the shockwave signal. Following detection of the shockwave signal, the window is advanced in time and the total energy received in the window is measured as a function of advance time. The maximum of the measured total energy is associated with the muzzle signal.

In advantageous embodiments, the total energy can be determined by integrating the measured energy over the window, preferably disregarding portions in the detected signal caused by shockwave echoes. Advantageously, the peak signal value can be determined in the window producing the maximum total energy and if the peak signal value is greater than the measured total energy in the window by a predefined ratio factor, the peak signal value can be identified as being related to the muzzle signal.

Further features and advantages of the invention will be apparent from the following description of illustrative embodiments and from the claims.

BRIEF DESCRIPTION OF THE DRAWINGS

These and other features and advantages of the invention will be more fully understood by the following illustrative description with reference to the appended drawings, in which elements are labeled with like reference designations and which may not be to scale.

DESCRIPTION OF ILLUSTRATIVE EMBODIMENTS

As described above in summary, the invention provides, in various embodiments, methods and systems for shooter range estimation and disambiguation of projectile trajectories. These systems and method are particularly useful and advantageous, when an insufficient number of parameters required for an accurate solution are detected or when such parameters cannot be detected reliably.

Figure 1:
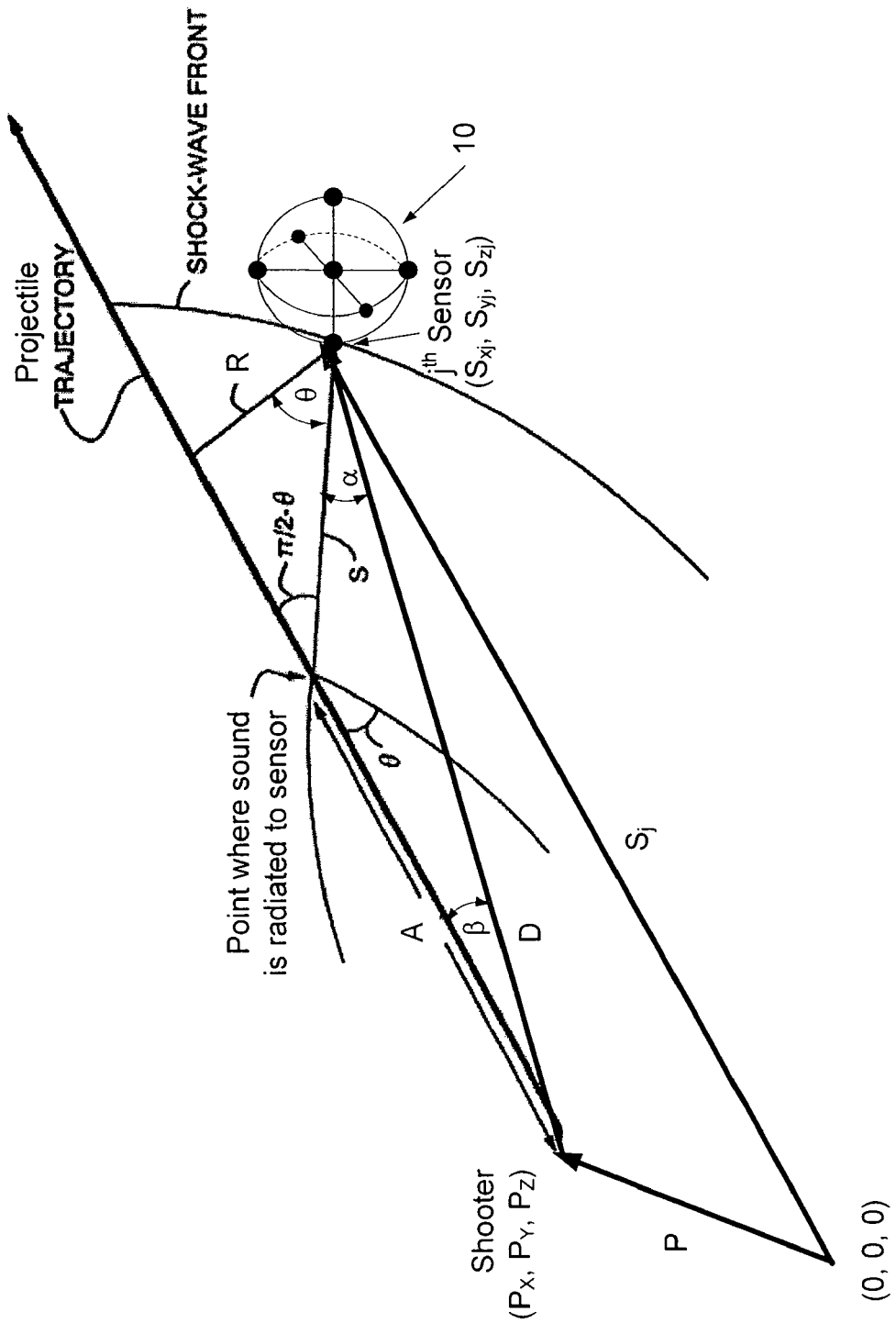
FIG. 1 is a schematic diagram of a shockwave Time-of-Arrival (TOA) model.

FIG. 1 shows schematically a diagram of a Time of Arrival (TOA) model, which is described in more detail in U.S. Pat. No. 6,178,141 (incorporated herein by reference in its entirety). The TOA model can be used to estimate the trajectory of the projectile and the shooter direction relative to the sensor location. The TOA model is based on a ballistic model taking into account certain physical characteristics relating to the projectile's flight path, such as the air density (which is related to temperature); the position $\vec{P}$ ($P_x$, $P_y$, $P_z$) of a shooter; the azimuth and elevation angles of the rifle muzzle; the muzzle velocity of the projectile (or equivalent Mach number); and the speed of sound (which varies with temperature/air density). With this ballistic model, it is possible to accurately calculate the time at which the shockwave and muzzle blast reach a particular point in space.

As depicted in the diagram of FIG. 1, the shooter is located at point $\vec{P}$ ($P_X$, $P_Y$, $P_Z$) relative to an origin (0, 0, 0), the various sensors are located at points $\vec{S}_j$ ($S_{xj}$, $S_{yj}$, $S_{zj}$) and the bullet trajectory is shown as emanating from the shooter in the direction of $\vec{A}$. The vector from the shooter to the $j^{th}$ sensor is $\vec{D}$, the closest point of approach (CPA) of the bullet to the $j^{th}$ sensor is $|\vec{R}|=|\vec{D}|\sin(\beta)$, and the path followed from the point where the shockwave is radiated from the trajectory to the $j^{th}$ sensor is $\vec{S}$ (the index j of the sensors has been omitted). The Mach angle of the bullet is $\theta=\sin^{-1}(1/M)$, $M=V/c_0$. M is the Mach number of the projectile, V is the supersonic velocity of the projectile, and $c_0$ is the (pressure- and temperature-dependent) speed of sound. The 'miss-angle' between trajectory and the $j^{th}$ sensor is $\beta$. The trajectory is characterized by its azimuth angle measured counter-clockwise from the x-axis in the x-y plane and by its elevation angle measured upward from the x-y plane. The equations that define the shockwave arrival time $t_j$ and unit vector at the $j^{th}$ sensor are written in terms of these geometrical quantities.

The time of arrival is equal to the time $$\frac{|\vec{A}|}{V}$$

it takes for the projectile to travel the distance $|\vec{A}|$ to the point were sound is radiated toward the $j^{th}$ sensor, plus the time it takes the shockwave to travel the distance $|\vec{S}|$ from the radiation point to the $j^{th}$ sensor, $$\frac{|\vec{S}|}{c_0}.$$

$$t_j = t_0 + \frac{|A|}{V} + \frac{|S|}{c_0} = t_0 + \frac{|D|}{c_0}\sin(\beta + \theta), \quad (1)$$

wherein $t_0$ is a time reference (firing time) and $c_0$ is the speed of sound. The Mach angle $\Theta$ is also indicated in FIG. 1.

It can be safely assumed that the velocity V of the projectile remains constant over a distance corresponding to the sensor spacing, so that there is insignificant loss of speed between the times the projectile radiates to the different sensors. However, over longer distances projectiles are known to slow down due to air resistance. The air resistance can be expressed by a drag coefficient $C_b$ which depends on the bullet shape and bullet caliber. A mathematical ballistics model derived from physical principles can predict the arrival time of a shockwave at any general point in space as a function of a full set of parameters describing the projectile (e.g., by its drag coefficient $C_b$), its initial velocity, and the density of the surrounding air are known in advance.

Figure 2:
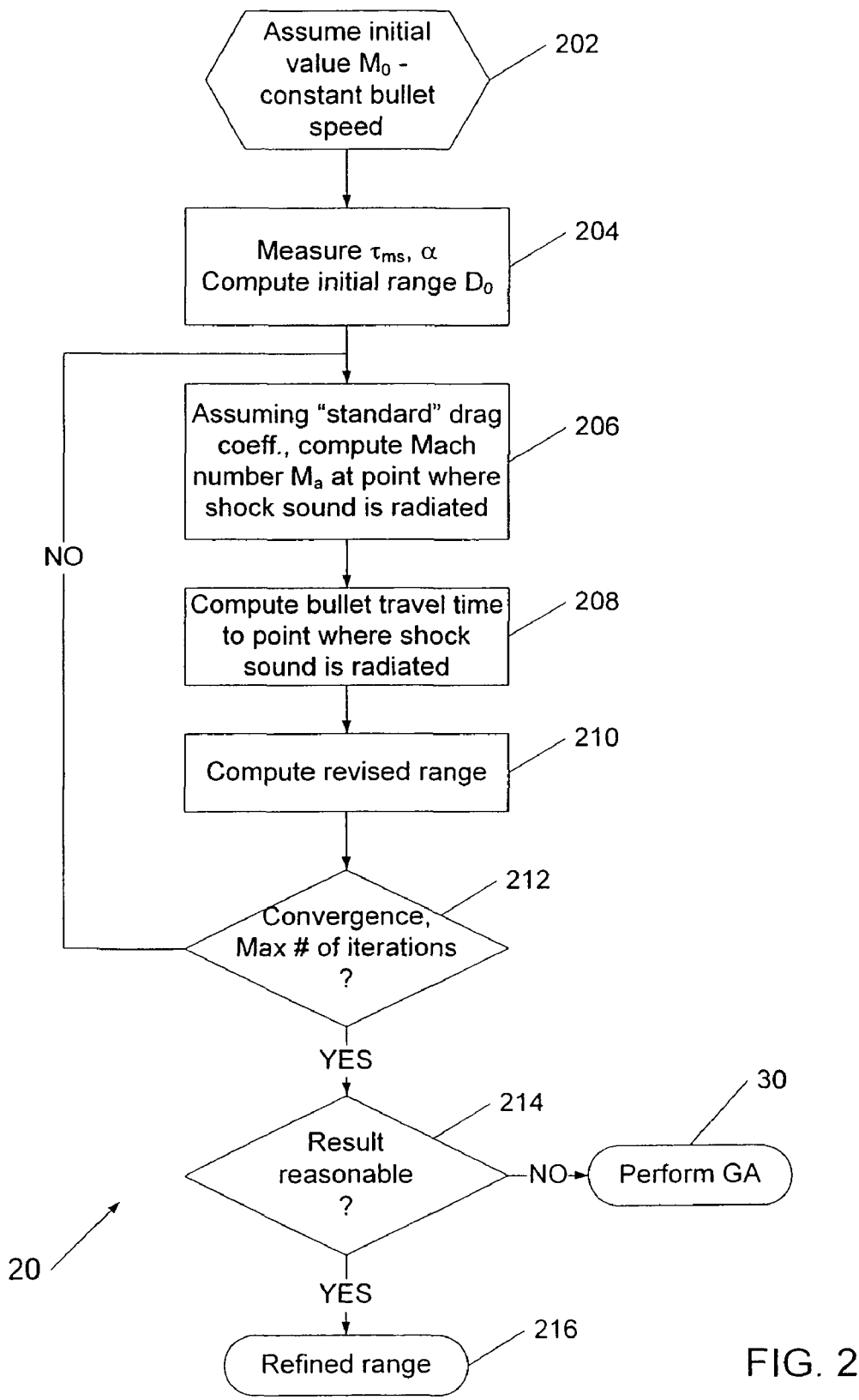
FIG. 2 shows a schematic process flow diagram for range estimation.

The parameters required for an exact calculation are typically not known in a realistic setting, such as a battlefield. However, range estimation can be significant improved by an iterative process shown in form of a process flow diagram 20 in FIG. 2, which takes into account deceleration of the projectile velocity along the trajectory. The process 20 begins at step 202 with the following assumptions:

$c_0$=speed of sound modified for outside temperature/air pressure ($\approx$340 m/s)

$C_b$=nominal drag coefficient averaged over anticipated weapons $V_0$=initial velocity of the projectile, when fired, averaged over anticipated weapons $M_0=V_0/c$=initial Mach number of projectile A first estimate of the shooter distance $D_0$ is computed in step 204 using the measured time-difference-of-arrival (TDOA) $\tau_{ms}$ and an arrival angle $\alpha$ between shock and muzzle sound at the sensor array and by assuming an initial, constant speed $V_0$ and Mach number $M_0$, according to the equation $$D_0 = \frac{\tau_{ms} \cdot c_0}{1 - \cos(\alpha)} \quad (2)$$

With these assumptions, the projectile's speed at a distance a from the shooter position $\vec{P}$ can be computed in step 206 from the equation $$M_a = M_0\left(1 - \frac{a}{C_b\sqrt{V_0}}\right)^2 \quad (3)$$

so that the time the projectile travels the distance a along the trajectory becomes, step 208, $$T_a = \frac{a}{V_0 - \frac{a \cdot \sqrt{V_0}}{C_b}} \quad (4)$$

The angle $\Theta$ is related to the Mach number $M_a$ by the equation $$\sin(\Theta) = \frac{1}{M_a} \quad (5)$$

wherein the Mach number $M_a$ is initially set to $M_0$. It should be noted that the instantaneous bullet velocity is set to the speed of sound (i.e., $M_a$=1) if the computed bullet velocity becomes less than the speed of sound. The revised distance $a=|\vec{A}|$ in step 210 then becomes $$a = D_0 \cdot \cos(\beta) \cdot \left(1 - \frac{\tan(\beta)}{\sqrt{M_a^2 - 1}}\right). \quad (6)$$

The angles $\alpha$, $\beta$, and $\Theta$ are related by the equation $(\alpha+\beta+\Theta)=90°$. The process 20 then loops back to step 206 by inserting the computed value for the distance a in equations (3) and (4), yielding an updated Mach number $M_a$ and an updated bullet travel time $T_a$, respectively, for the traveled distance a. The measured TDOA $\tau_{ms}$ and the computed updated values for $T_a$ and a are then used to successively update the value D for the shooter range:

$$D=c_0 \cdot (\tau_{ms}+T_a)+s \quad (7)$$

This process is repeated until either a maximum number of iterations has been reached or the range values D converge, as determined in step 212.

The process 20 also checks in step 214, if the revised range value $D=|\vec{D}|$ for the distance between the shooter and the sensor array is a "reasonable" value, in which case the process 20 terminates at step 216. For example, the value for D can be considered valid if the distance a traveled by the projectile and the distance $$s = a \cdot \frac{\sin(\beta)}{\sin(\alpha)}$$

between the sensor and the point where the sound wave is radiated from the projectile to the sensor are valid number values, i.e., not a NAN. A NAN is a special floating point value representing the result of a numerical operation which cannot return a valid number value and is typically used to prevent errors from propagating through a calculation. In addition, α and β should both be less than a predetermined threshold value, indicating that the projectile was indeed fired toward the sensor array.

As mentioned above, the number pair ($\tau_{ms}$, α) is initially used to compute the shooter range $D_0$ in zeroth approximation, neglecting change in the projectile's speed along the trajectory. If the iterative process 20 described above does not return a consistent geometry supporting the number pair ($\tau_{ms}$, α), then the solution is discarded.

Even if an exact solution may not be obtainable, it is a goal to find values for the shooter range D and the missed azimuth and elevation angles (which are related to β) that most closely match a measured shock TDOA and a measured muzzle TDOA. As already mentioned, the shockwave-only TDOA's between the various sensors can in most situations be reliably measured. The shooter azimuth and shooter elevation, but not the shooter range, can be determined from the shockwave-only TDOA's using the known sensor array coordinates ($S_{xj}$, $S_{yj}$, $S_{zj}$). It will be assumed that the TDOA $\tau_{ms}$ between the detected shockwave and the muzzle sound can also be measured, whereby the muzzle sound may not be detected by all the sensors.

If it is determined in step 214 that the iterative process 20 does not return a valid result, then the process 20 attempts to compute the shooter range by invoking an evolutionary genetic algorithm (GA) 30. GA's mimic natural evolutionary principles and apply these to search and optimization procedures. A GA begins its search with a random set of solutions, instead of just one solution. Once a random population of solutions is created, each is evaluated in the context of the nonlinear programming problem and a fitness (relative merit) is assigned to each solution. In one embodiment, the fitness can be represented by the Euclidean distance between a calculated solution and the measured solution, for example, by $$\Delta\tau_{min} = \sqrt{\frac{\sum_{j=1}^{N}(\tau_{Shock,calc}^{j} - \tau_{Shock,meas}^{j})^2}{N}} + abs\left(\sum_{i=1}^{N}\left(\frac{\tau_{ms,calc}^{i}}{M}\right) - \tau_{ms,meas}\right) \quad (8)$$

Intuitively, an algorithm producing a smaller value of $\Delta\tau_{min}$ is better.

Figure 3:
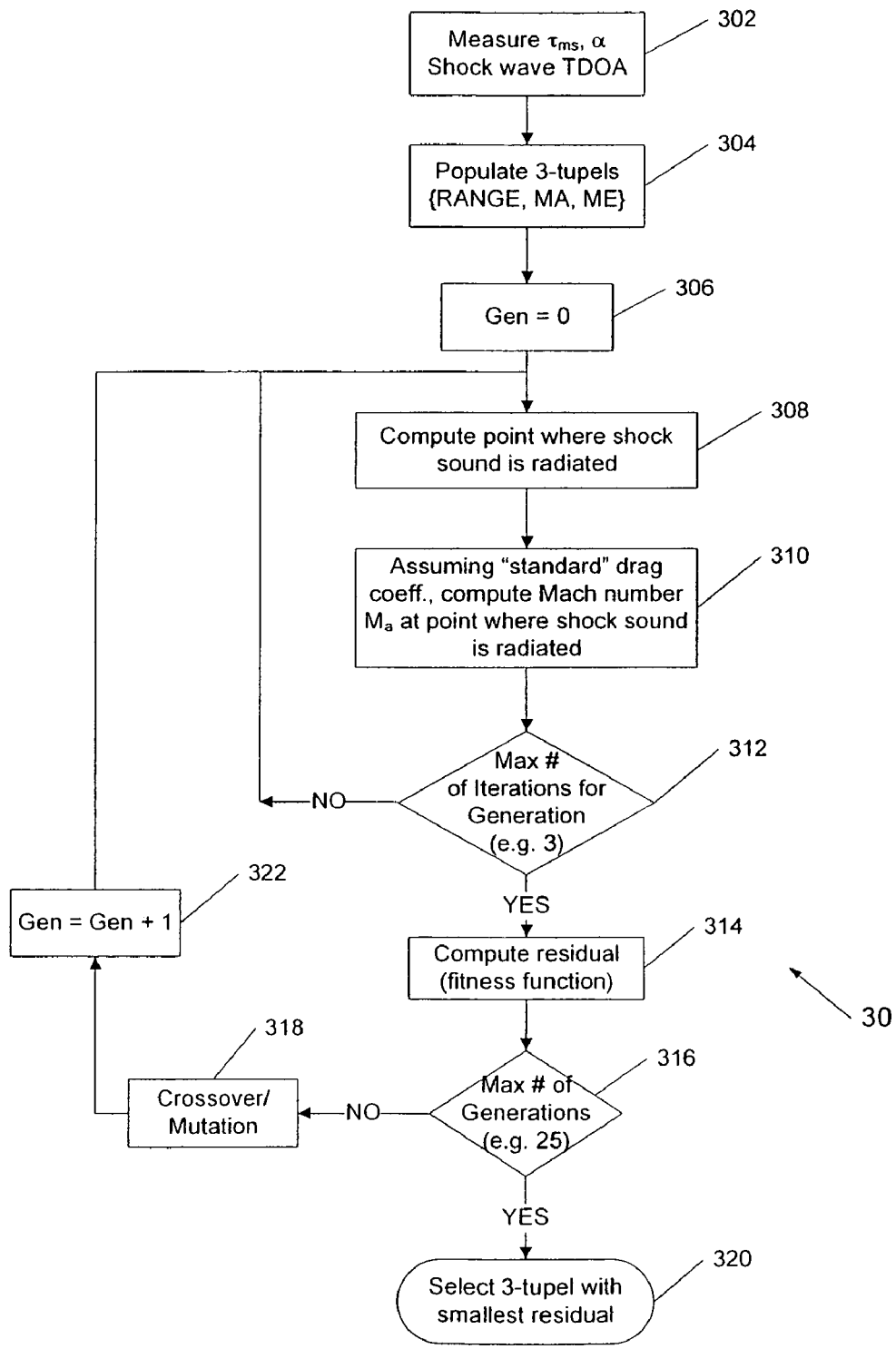
FIG. 3 shows a schematic process flow diagram of a genetic algorithm for range estimation.

A schematic flow diagram of the GA process 30 is shown in FIG. 3. The process 30 uses the time-difference-of-arrival (TDOA) $\tau_{ms}$ and the arrival angle α measured previously for process 20, step 302. An exemplary number of 3-tupes having the values {RANGE, MA, ME} is defined as an initial population, step 304, wherein RANGE is the shooter range D=|$\vec{D}$| shown in FIG. 1, MA is the missed azimuth, and ME is the missed elevation. The MA and ME values indicate by how much the bullet missed the target in azimuth and elevation space. The target in the illustrate example is assumed to be the sensor array. The initial population in step 304 is created by random selection of the 3-tupel spanning a meaningful and reasonable range of values:

Range$_{Shooter}$={1000, . . . , 3000} [meter],
Azimuth$_{Missed}$={-20, . . . , 20} [degrees], and
Elevation$_{Missed}$={-20, . . . , 20} [degrees].

The computation essentially follows the same process as outlined above. Initially, for generation Gen=0, step 306, the shooter position vector $\vec{P}$ ($P_x$, $P_y$, $P_z$) is computed for each 3-tupel with the previously determined shooter azimuth and elevation, and an assumed RANGE for the particular 3-tupel. Assuming an initial Mach number $M_0$, the vector $\vec{A}$ ($A_x$, $A_y$, $A_z$), i.e. the position from where the shock sound is radiated, is computed with the MA and ME values for each 3-tupel, step 308. The distances $\vec{D} = \vec{S}_j - \vec{P}$ between the shooter and each sensor j that detects a shockwave are also computed.

For each 3-tupel, the angle β is computed from the equation $$\cos\beta = \frac{\vec{A}\bullet(\vec{P}-\vec{S})}{|\vec{A}|\cdot|\vec{P}-\vec{S}|},$$

wherein the symbol "•" indicates the scalar product between the two vectors. Updated values for the distance a, the travel time $T_a$ of the projectile over the distance a, and the Mach number $M_a$ are computed by inserting the computed value for β and the initially assumed values for $M_a$=$M_0$ and a into equations (3), (4), (6), and (7), step 312. This process is iterated several times for each of the 3-tupels, for example 3 times, as determined in step 312, whereafter the residual defined in equation (8) is computed for each 3-tupel, step 314.

It is checked in step 316 if a maximum number of iterations for the GA, for example 25 iterations, have been reached. If the maximum number of iterations has been reached, then the process 30 stops at step 320, returning the 3-tupel with the smallest residual. Otherwise, the process 30 creates a new population through a crossover and mutation operation, step 318, and the generation counter is incremented by one, step 322

In each generation, the "best" individual is allowed to survive unmutated, whereas the top 100 individuals, as judged by their fitness, also survive, but are used to create the next 100 individuals from pairs of these survivors with the crossover/mutation operators listed in Table 1 below.

The following exemplary crossover and mutation operators were used to demonstrate the process 30:

TABLE 1

| Operator Name | Operator Type | Probability | Description |
|---|---|---|---|
| Missed Azimuth-Crossover | Crossover | 0.5 | Exchange missed azimuth between two chromosomes |
| Missed- elevation Crossover | Crossover | 0.5 | Exchange missed elevation between two chromosomes |
| Missed- range Crossover | Crossover | 0.5 | Exchange range between two chromosomes |

TABLE 1-continued

| Operator Name | Operator Type | Probability | Description |
|---|---|---|---|
| Field-Mutation | Mutation | 0.3 | Replace a given field (with a probability of 0.25 per field) with a randomly selected new value within range |
| Incremental-Mutation | Mutation | 0.4 | Introduce small perturbations in all fields of a chromosome (within ±2 meter for shooter range; within ±0.1° for missed azimuth and elevation) |

The GA process 30 is executed with an initial population of 200 different 3-tupels, with a refill rate of 50, for a total of 25 generations. The GA is run 5 times in parallel with different sets of initial 3-tupels, and the solution with the smallest residual is selected as the final solution for the RANGE, missed azimuth, and missed elevation of the shooter, which allows computation of vector $\vec{D}$.

Calculations that do not take into consideration the deceleration of the projectile along its path due to air resistance tend to overestimate range. For certain geometries and sufficiently distant shots, this overestimation may exceed 20%. The aforedescribed process removes this bias from range estimation for long-range shot detections.

Although shock-wave only solutions may be ambiguous, they can frequently be disambiguated by comparing the residuals from two different trajectories and selecting the trajectory with the smaller residual.

The residual of the shockwave-only solution can be defined as $$\Delta\tau_{min} = \sqrt{\sum_j (\Delta\tau^j_{Shock,calc} - \Delta\tau^j_{Shock,meas})^2} \quad (9)$$

summed over all sensors j. The solution with the smallest value for $\Delta\tau_{min}$ is selected as the most likely solution for the shooter direction. The precision of disambiguation can be improved, for example, by employing a genetic algorithm GA of the type disclosed, for example, in commonly assigned U.S. patent application Ser. No. 10/925,875.

If the muzzle blast signals are detected on 4 or more sensor channels, then the aforedescribed shock-muzzle algorithms can be used to unambiguously determine the shooter location, regardless of the number of shock channels. If the muzzle blast signals are detected in fewer than 4 sensors, but shockwave signals are detected in 5 or more shockwave channels, then the aforementioned GA can be used with a modified cost function or residual, whereby whatever muzzle signals are available are "mixed" into the optimization function to disambiguate the shockwave-only solution and/or refine the estimation of the shooter range. However, if fewer than 3 muzzle channels AND fewer than 5 shockwave channels are detected, then an alert can be activated without attempting to localize the shooter.

The muzzle signal may not be reliably detected on all channels, because:
1. The detection level on one or more channels is too low to detect with confidence.
2. The muzzle energy is not discernable in the raw signal, causing the system to correlate with 'noise', giving unreliable TDOA estimates.
3. Echoes from the shockwave can be stronger than the muzzle blast and can arrive earlier than the muzzle blast, causing the system to falsely detect shock as muzzle.

With a muzzle blast signal only detected on some channels, the residual in this situation can be defined as $$\Delta\tau_{min} = \sqrt{\sum_i (\Delta\tau^i_{muzzle,calc} - \Delta\tau^i_{muzzle,meas})^2 + \sum_j (\Delta\tau^j_{Shock,calc} - \Delta\tau^j_{Shock,meas})^2}, \quad (10)$$

wherein the first term for the muzzle blast is summed over the reduced number of sensors (<4) that detect the muzzle blast, and j is summed over the sensors detecting the shockwave (typically all sensors).

When applying the GA to disambiguate the shooter direction and projectile trajectory under these circumstances, the exemplary GA uses as a chromosome an initial population of 200 4-tupels, with each 4-tupel containing the following values:

[Azimuth$_{Shooter}$, Elevation$_{Shooter}$, Azimuth$_{Missed}$, Elevation$_{Missed}$].

The values [Azimuth$_{Shooter}$, Elevation$_{Shooter}$] are defined by the angle (90°−(Θ+β)), while the values [Azimuth$_{Missed}$, Elevation$_{Missed}$] are defined by the angle β (see FIG. 1). An initial range of, for example, 1000 m can be assumed for the shooter range.

The initial population is created by random selection of the 4-tupels spanning a meaningful and reasonable range of values (all values are in degrees):
Azimuth$_{Shooter}$={0, . . . , 360},
Elevation$_{Shooter}$={−10, . . . , 30},
Azimuth$_{Missed}$={−20, . . . , 20}, and
Elevation$_{Missed}$={−20, . . . , 20}.

Figure 4:
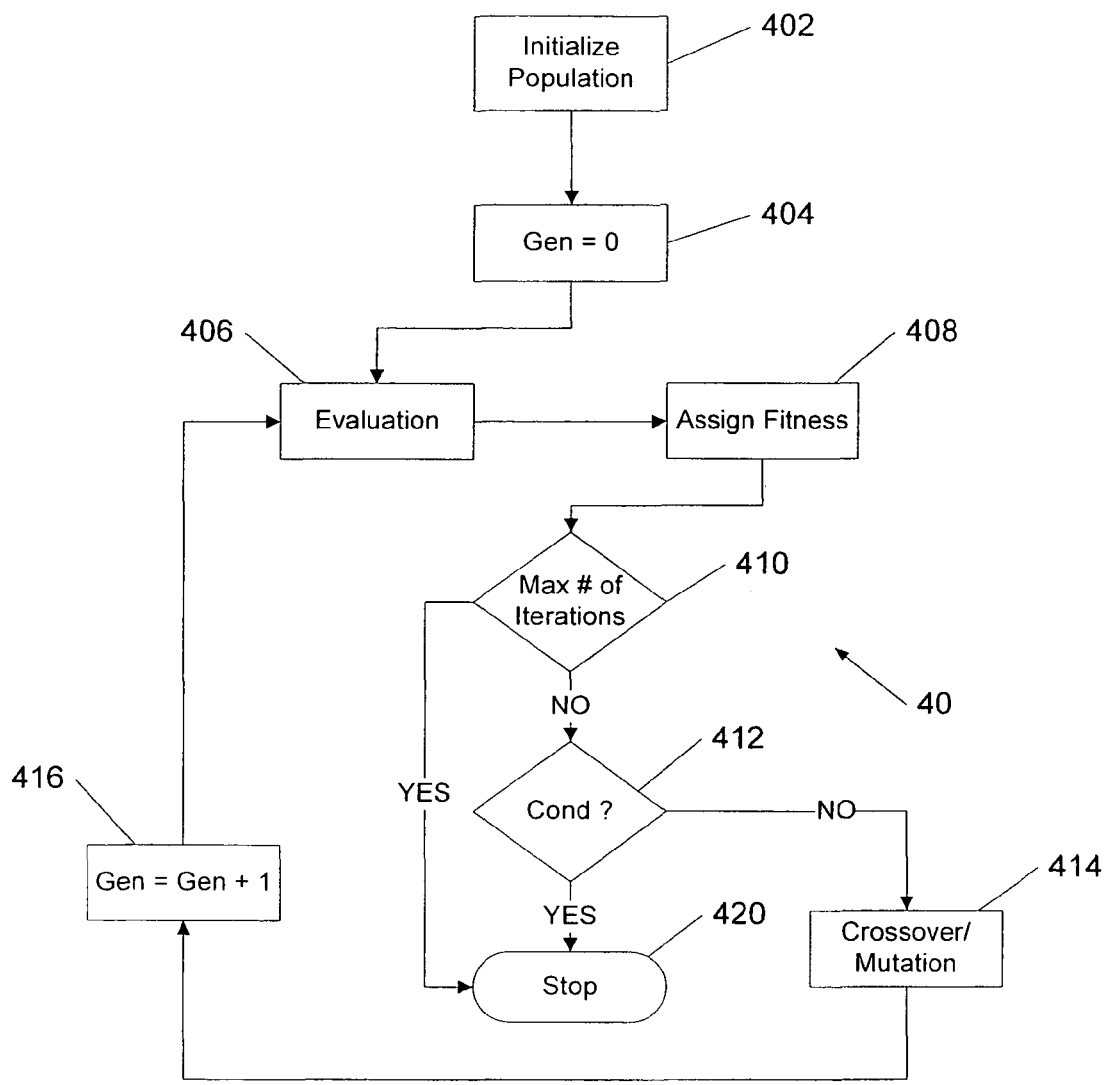
FIG. 4 shows a schematic process flow diagram of a genetic algorithm for disambiguating between shooter trajectories.

A schematic flow diagram of the GA process 40 is shown in FIG. 4. The GA process 40 begins its search by initializing a random population of solutions, step 402, and sets a generation counter to zero indicating the initial solution set, step 404. Once a random population of solutions is created, each is evaluated in the context of the nonlinear programming problem, step 406, and a fitness (relative merit) is assigned to each solution, step 408. The fitness can be represented by the residual $\Delta\tau_{min}$ between a calculated solution and the measured solution, as described above. It is checked in step 410 if a maximum number of iterations for the GA, which can be set, for example, to 25, has been reached. If the maximum number of iterations has been reached, the process 40 stops at step 420, and the result can be either accepted or further evaluated. Otherwise, step 412 checks if preset fitness criteria have been satisfied.

Fitness criteria can be, for example, a computed missed azimuth of <15° and/or a ratio of the residuals of two ambiguous solutions. If the fitness criteria are satisfied, the process 40 stops at step 420; otherwise, a new population is created through crossover/mutations, step 414, and the generation counter is incremented by one, step 416.

In each generation, the "best" individual is allowed to survive unmutated, whereas the top 100 individuals, as judged by their fitness, also survive, but are used to create the next 100 individuals from pairs of these survivors with the crossover/mutation operators listed in Table 2.

The following exemplary crossover and mutation operators were used to demonstrate the process 40:

TABLE 2

| Operator Name | Operator Type | Probability | Description |
| --- | --- | --- | --- |
| Azimuth-Crossover | Crossover | 0.5 | Exchange shooter/trajectory azimuth between two chromosomes |
| Missed-Crossover | Crossover | 0.5 | Exchange missed azimuth/elevation between two chromosomes |
| Field-Mutation | Mutation | 0.3 | Replace a given field (with a probability of 0.25 per field) with a randomly selected new value within range |
| Incremental-Mutation | Mutation | 0.4 | Introduce small mutations in all fields of a chromosome (within ≦2° for shooter information; within ≦0.5° for missed information |
| Flip-Mutation | Mutation | 0.1 | Change the solution into the ambiguous alternate solution |
| No-Mutation | Mutation | 0.2 | Chromosome remains intact |

Recent experimental trials indicated a decrease of ambiguous shots from 95% to 8% on the same data set by using at least one muzzle signal channel in addition to 5 or more shockwave channels.

As demonstrated by the examples described above, the muzzle blast signal provides important information about the shooter azimuth and hence the projectile's trajectory as compared to a shockwave-only solution, so that the computed trajectory solution aligns more closely with one of the ambiguous solutions, i.e., thus disambiguating the solutions.

Without at least some reliable muzzle signals, a significant number of ambiguous shockwave-only solutions may be generated in particular at long shooter distances, which are less desirable than a smaller number of unambiguous, but less precise solutions.

In the event of potentially unreliable muzzle detection, an attempt can still initially be made to detect muzzle signals, e.g., to find a muzzle blast signature in a noisy signal, and to compute the resulting TDOA's. The muzzle detection will be deemed to be reliable if muzzle signals are found on a sufficient number of sensor with sufficient cross-correlation between the channels, and if there is a sufficiently strong correlation between the muzzle signal and the corresponding raw band on each channel (offset by a number of bins to account for filter delays).

Otherwise, at least the muzzle signals that show insufficient correlation are erased, and the following 'coarse muzzle detection' logic is invoked:
  Look for peaks in the shock energy following a shock. Flag these peaks as likely 'shock echoes', thereby excluding them as muzzle blasts.
  Determine a maximum time it would take the muzzle wave to traverse the sensor array and define a "window" having the corresponding duration. Search for muzzle energy peaks by moving this window across substantially all detector channels following the detected shockwave, skipping sections in the detected signal which have been identified as shock echoes. Integrate the energy over the window, i.e., seek the maximum of:

$$f(i) = \sum_{n=0}^{N} \sum_{j=0}^{W} (mb_{i+j}^n)^2 \quad (11)$$

wherein the square of $mb_{i+j}$ represents a measure of energy, e.g., energy of the muzzle blast, measured by the $n^{th}$ sensor. (i+j) indicates the detection channel, with i denoting a discrete time interval between the time the shockwave was detected and the beginning of the window, and j represents a time interval measured from the start of the window.

To discriminate against noise, the peak energy in the window producing the maximum of function $f_{max}(i)$ in equation 11 is checked to determine if the energy peak at that maximum is greater than the energy across the window by a given ratio factor. If this is the case, then the signal in the window is identified as a muzzle detection, and cross-correlation is performed on all channels in the muzzle blast band mb to determine muzzle TDOA's.

The detected muzzle blast signal can then be used to determine the shooter range and/or disambiguate the shockwave signal, as described above.

While the invention has been disclosed in connection with the preferred embodiments shown and described in detail, various modifications and improvements thereon may be made thereto without departing from the spirit and scope of the invention. By way of example, although the illustrative embodiments are depicted as having acoustic sensors, such as microphones, this need not be the case. Instead, other types of pressure-sensitive mechanical or electrical sensors may be used. Moreover, the values given in Tables 1 and 2 for the various operators are intended to be examples only, and other values may be selected depending on the actual conditions in the field. Accordingly, the spirit and scope of the present invention is to be limited only by the following claims.

What is claimed is:

1. A method for identifying a muzzle blast within a signal generated by an array of acoustic sensors forming an antenna, comprising:
  defining, by a processor, a width for a time window corresponding to a time required for the muzzle blast to traverse the array of acoustic sensors;
  detecting, by the processor, a shockwave within the generated signal;
  after detecting the shockwave, measuring, by the processor, total energy of the generated signal in a series of consecutive time windows as a function of time and as a function of the number of acoustic sensors that generated the signal, wherein each time window has the defined width;

identifying, by the processor, one of the consecutive time windows having a maximum measured total energy relative to each of the remainder of the consecutive time windows; and associating, by the processor, the identified time window as corresponding to the muzzle blast.

2. The method of claim 1, wherein measuring the total energy includes the processor integrating the measured energy over the window and over the number of acoustic sensors.

3. The method of claim 1, further including identifying, by the processor, shockwave echoes and disregarding windows in the generated signal corresponding to the identified shockwave echoes.

4. The method of claim 1, further including:

determining, by the processor, a point corresponding to a peak energy in the identified time window; and associating, by the processor, the point with the muzzle blast if the peak energy at the point is greater than a measured total energy of the remainder of the points in the identified time window by a given ratio factor.

5. The method of claim 4, further including performing, by the processor, a cross-correlation across acoustic sensors signals that generated the signal in a muzzle blast frequency band corresponding to the muzzle blast to determine a set of muzzle blast time differences of arrival (TDOA) measurements.

6. The method of claim 5, wherein the muzzle blast frequency band is between approximately 700 Hz and approximately 10 kHz.

7. The method of claim 1, further including the processor using the muzzle blast to detect a shooter location.

8. A system for identifying a muzzle blast within a signal generated by an array of acoustic sensors forming an antenna, comprising:

a plurality of acoustic sensors for generating the signal;

a processor configured to:

define a width of a time window corresponding to a time required for a muzzle blast to traverse the array of acoustic sensors;

detect a shockwave within the generated signal;

responsive to the detection of the shockwave, measure total energy in a series of consecutive time windows as a function of time and as a function of the number of acoustic sensors that generated the signal, wherein each time window has the defined width;

identify one of the consecutive time windows having a maximum measured total energy relative to each of the remainder of the consecutive time windows; and associate the identified time window as corresponding to the muzzle blast.

9. The method of claim 1, wherein the number of acoustics sensors that generated the signal is greater than one.

10. The method of claim 1, wherein the measured total energy is the total energy received from multiple acoustic sensors.

11. The system of claim 8, wherein the number of acoustic sensors that generated the signal is greater than one.

12. The system of claim 8, wherein the measured total energy is the total energy received from multiple acoustic sensors.

* * * * *